May 16, 1933.  C. A. BROWER ET AL  1,909,750
MILK COOLER
Filed July 25, 1932  2 Sheets-Sheet 2

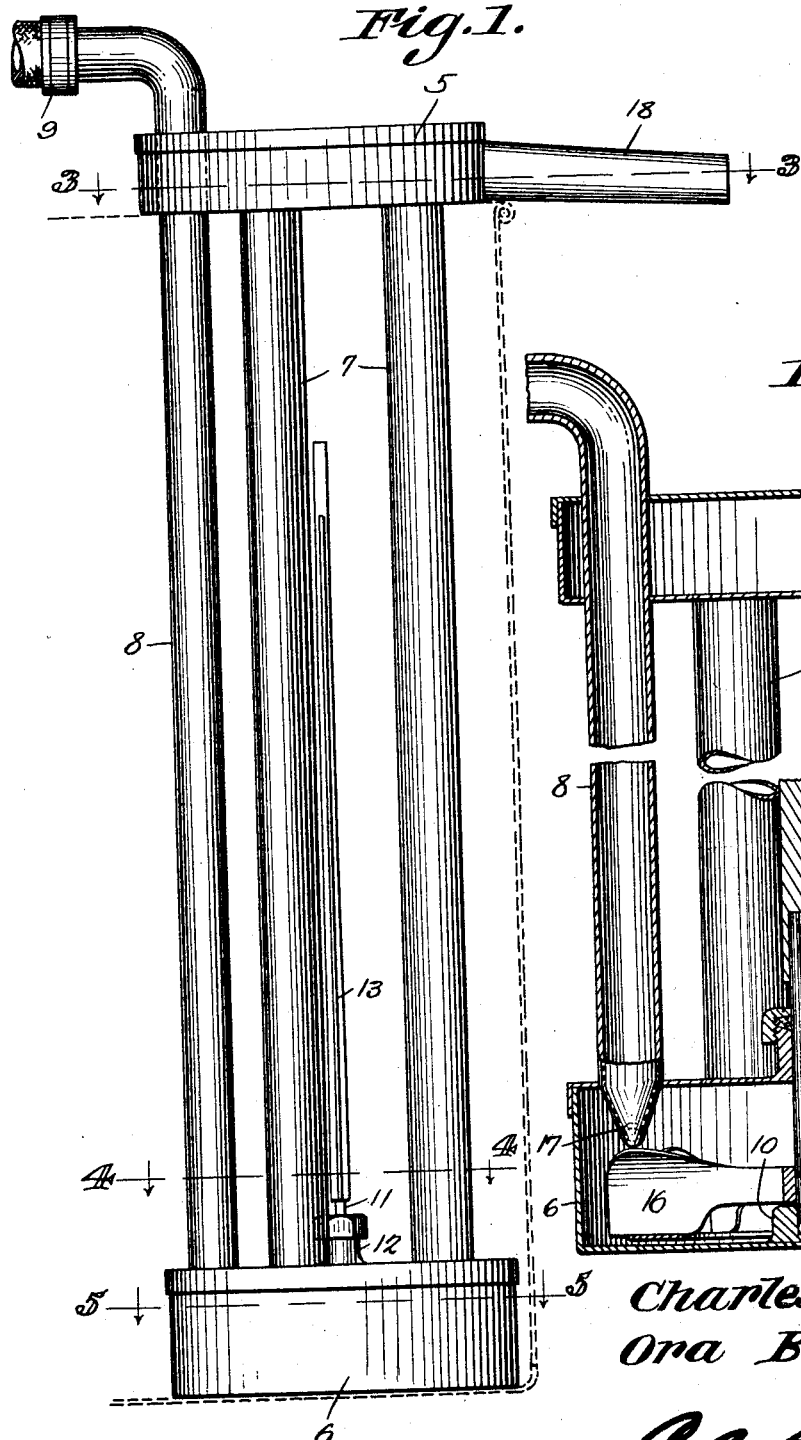

Charles A. Brower
Ora Brower
Inventors

Patented May 16, 1933

1,909,750

UNITED STATES PATENT OFFICE

CHARLES A. BROWER AND ORA BROWER, OF LANSING, MICHIGAN, ASSIGNORS OF ONE-HALF TO CHARLES SMITHERS, OF HOLT, MICHIGAN

MILK COOLER

Application filed July 25, 1932. Serial No. 627,294.

This invention has reference to a device designed for cooling milk, and aims to provide a device which may be readily and easily positioned in a container such as a milk can, milk tank or the like to readily cool the milk when a cooling fluid is passed therethrough.

An important object of the invention is to provide a device of this character having means operated by the flow of water or cooling fluid through the device, for agitating the milk under treatment, thereby insuring a rapid cooling of the milk.

A still further object of the invention is to provide a cooler which may be readily connected with the usual water supply, eliminating the necessity of making alterations in the construction of the device.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a milk cooler constructed in accordance with the invention.

Figure 2 is a longitudinal sectional view therethrough.

Figure 3:
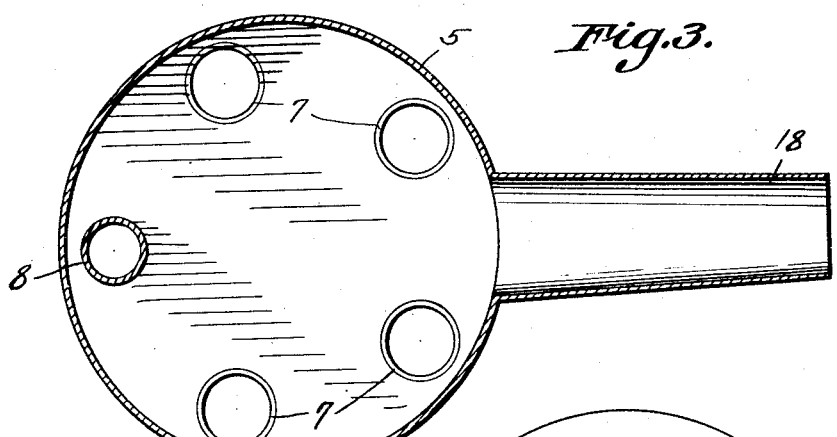
Figure 3 is a sectional view taken on line 3—3 of Figure 1.
Figure 4:
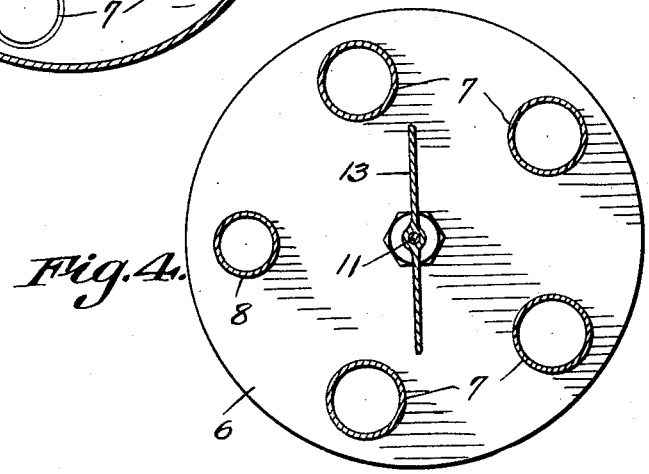
Figure 4 is a sectional view taken on line 4—4 of Figure 1.
Figure 5:
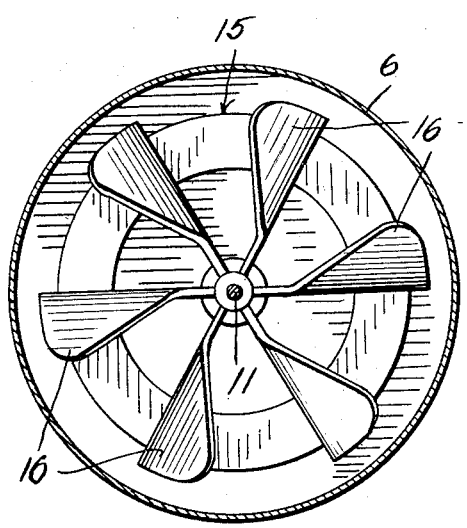
Figure 5 is a sectional view taken on line 5—5 of Figure 1.
Figure 6:
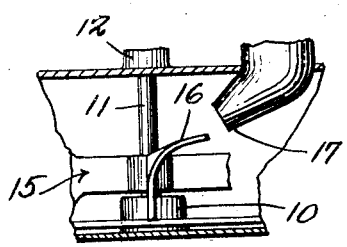
Figure 6 is a fragmental sectional view illustrating the detail construction of the propeller.

Referring to the drawings in detail, the cooler embodies an upper chamber 5 and a lower chamber 6, the upper and lower chambers being connected by the vertical pipes 7, that are in communication with the interiors of the chambers, so that water may readily pass between the chambers.

The reference character 8 designates the water inlet pipe, which is provided with a connection 9 by means of which a hose or pipe from a water supply, may be connected to the cooler.

As shown, the pipe 8 extends through the upper chamber 5, and discharges water into the lower chamber 6, from where it passes to the pipes 7.

Disposed within the lower chamber 6, is a bearing 10 that accommodates the lower end of the vertical shaft 11 which also passes through the bearings 12, the upper end of the shaft supporting the agitating blade 13, that is of a length to extend an appreciable distance above the lower chamber 6, as shown by Figure 1 of the drawings.

A gasket 14 is provided and insures a fluid-tight connection between the shaft 11 and its bearing, eliminating any possibility of the water in the lower chamber, finding its way into the milk under treatment.

Mounted on the shaft 11, is a propeller 15 that has curved blades 16 so disposed that water passing through the pipe 8 and through the nozzle 17 at the lower end thereof, will strike the blades rotating the propeller and consequently rotating the agitating blade 13, agitating the milk in the container and causing the milk to circulate around the pipes 7, which are cooled by the water passing through the pipes.

A spout indicated by the reference character 18 communicates with the interior of the upper chamber 5, and discharges the water from the upper chamber, after it has accomplished its purpose.

In the use of the device, the cooler is connected with a suitable water supply not shown, and the cooler is submerged in a can, tank or other container which has been filled with milk to be cooled. Cold water now circulates through the cooler, rotating the propeller, which in turn operates the agitating blade to stir the milk and cause the milk to circulate around the pipes of the device, cooling the milk.

Owing to the construction of the device, the device is portable, and may be readily removed and positioned in another container, for cooling the contents thereof.

We claim:

1. A milk cooling device comprising a body portion to be submerged in a container of milk, including an upper chamber and a lower chamber, pipes connected with the chambers and communicating therewith, a pipe for directing cooling liquid to the chambers and pipes, a propeller mounted within the lower chamber, an agitating blade operated by the propeller for agitating the liquid in which the device is submerged, and a nozzle for directing the cooling liquid to the propeller, rotating the propeller.

2. A milk cooling device comprising a body portion adapted to be submerged in a container of milk, said body portion including an upper chamber and a lower chamber, pipes connecting the chambers, a propeller operating in the lower chamber, a vertical agitator disposed between the pipes and chambers for agitating milk in the milk container, and a pipe for directing cooling liquid to the propeller operating the propeller and agitator.

3. A milk cooling device comprising a body portion including cooling chambers, pipes communicating with the cooling chambers so that cooling liquid may flow therethrough, a propeller operating in one of the chambers, a shaft extending from the propeller, an agitating blade on the shaft and operating between the pipes for agitating the milk within which the body portion is positioned, and a pipe for directing cooling liquid to the propeller, operating the propeller.

In testimony that we claim the foregoing as our own, we have hereto affixed our signatures.

CHAS. A. BROWER.
ORA BROWER.